US011244520B2

(12) United States Patent
Carbonne et al.

(10) Patent No.: US 11,244,520 B2
(45) Date of Patent: Feb. 8, 2022

(54) SYSTEM FOR COLLECTING AND ANALYZING DATA RELATING TO AN AIRCRAFT

(71) Applicant: Airbus Operations SAS, Toulouse (FR)

(72) Inventors: Serge Carbonne, Toulouse (FR);
Fabien Roux-Portalez, Seilh (FR);
David Cumer, Pin-Balma (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 189 days.

(21) Appl. No.: 16/572,416

(22) Filed: Sep. 16, 2019

(65) Prior Publication Data
US 2020/0090422 A1   Mar. 19, 2020

(30) Foreign Application Priority Data

Sep. 18, 2018 (FR) ...................................... 1858389

(51) Int. Cl.
| | |
|---|---|
| *G07C 5/00* | (2006.01) |
| *B64F 5/60* | (2017.01) |
| *H04W 4/38* | (2018.01) |
| *H04W 4/42* | (2018.01) |
| *G07C 5/08* | (2006.01) |
| *H04Q 9/00* | (2006.01) |

(Continued)

(52) U.S. Cl.
CPC ............ *G07C 5/008* (2013.01); *B64D 45/00* (2013.01); *B64F 5/60* (2017.01); *G07C 5/02* (2013.01); *G07C 5/08* (2013.01); *H04W 4/38* (2018.02); *H04W 4/42* (2018.02); *B64D 2045/0085* (2013.01)

(58) Field of Classification Search
USPC ....................................................... 701/31.4
See application file for complete search history.

(56) References Cited

U.S. PATENT DOCUMENTS

| | | | |
|---|---|---|---|
| 8,344,912 B2 | 1/2013 | Mitchell et al. | |
| 2005/0258943 A1* | 11/2005 | Mian ................ | G08B 13/19695 340/426.1 |

(Continued)

FOREIGN PATENT DOCUMENTS

WO        2015013307 A1     1/2015

OTHER PUBLICATIONS

French Search Report; priority document.

*Primary Examiner* — Tyler D Paige
(74) *Attorney, Agent, or Firm* — Greer, Burns & Crain, Ltd.

(57) ABSTRACT

The system for collecting and analyzing data relating to safety and comfort criteria of an aircraft comprises an acquisition unit for acquiring basic aircraft information before a flight of the aircraft and values of flight parameters during the flight, the basic information and the flight parameter values forming a first set of digital data, a measurement unit for measuring values of environmental parameters during the flight and for storing, in a suitable digital format, a second set of digital data representative of the environmental parameter values, an analysis unit for analyzing the first and second sets of digital data, and radio communication systems for transmitting sets of digital data between the different units, the system allowing for a rapid collection and analysis of the digital data.

14 Claims, 2 Drawing Sheets

(51) Int. Cl.
B64D 45/00 (2006.01)
G07C 5/02 (2006.01)

(56) References Cited

U.S. PATENT DOCUMENTS

| | | |
|---|---|---|
| 2006/0004499 A1 | 1/2006 | Trego et al. |
| 2006/0251507 A1* | 11/2006 | Braswell ................ F01D 17/20 415/13 |
| 2008/0228331 A1 | 9/2008 | McNerney et al. |
| 2011/0043382 A1* | 2/2011 | Wang ....................... G01H 3/14 340/945 |
| 2015/0077737 A1* | 3/2015 | Belinsky .............. G08B 17/107 356/51 |
| 2016/0257415 A1* | 9/2016 | Ye .......................... B64D 17/00 |
| 2017/0259942 A1* | 9/2017 | Ziarno ................... G07C 5/085 |
| 2018/0232960 A1* | 8/2018 | O'Dell ..................... B64F 5/60 |
| 2020/0090422 A1* | 3/2020 | Carbonne ............... H04W 4/42 |

* cited by examiner

SYSTEM FOR COLLECTING AND ANALYZING DATA RELATING TO AN AIRCRAFT

CROSS-REFERENCES TO RELATED APPLICATIONS

This application claims the benefit of the French patent application No. 1858389 filed on Sep. 18, 2018, the entire disclosures of which are incorporated herein by way of reference.

FIELD OF THE INVENTION

The present invention relates to a system for collecting and analyzing data relating to safety and comfort criteria of an aircraft.

BACKGROUND OF THE INVENTION

Normally, before its delivery to a client or during overhaul operations, an aircraft, in particular a transport airplane, is made to perform test flights. During these test flights, data are acquired which, once analyzed, make it possible to check whether the aircraft satisfies safety and comfort criteria.

Generally, the assessment of these criteria is based on the acquisition and the analysis, by a dedicated system, of data relating to parameters of the aircraft that are as accurate as possible. They may be parameters such as the speed, the altitude of the aircraft during the test flight, but also the noise or the vibrations inside the aircraft. The collecting and analyzing of these data make it possible to analyze whether improvements need to be made before the delivery or the recommissioning of the aircraft.

The collection and the acquisition of data making it possible to check whether an aircraft satisfies safety and comfort criteria can be implemented by different systems. In particular, the safety and comfort criteria relating to the noises and the vibrations in the aircraft are assessed, in general, from measurements performed by a system comprising, generally, an additional computer placed in the cockpit and connected to an avionics bus in order to store, before and during the test flight of the aircraft, basic information and values of flight parameters of the aircraft such as the speed, the altitude, the pressure, etc. During the test flight, an operator uses a measurement device which comprises a microphone providing analogue measurements of the noise, and a thermocouple and an analogue pressure sensor for measuring the temperature and the pressure in the aircraft. The operator can also measure the vibrations in the aircraft by connecting, by a cable, two accelerometers to the measurement device. This type of vibration measurement is not performed continuously and can take up to five minutes. The operator then moves around, with the measurement device, at different points of the aircraft to perform a sufficient number of measurements. After the test flight, the values measured by the measurement device and records of values measured during prior test flights are downloaded by the operator to the additional computer, then transferred to an external server. All of these measurement and flight parameter values are subsequently available for an analysis.

This standard solution requires multiple data conversion and transfer steps which can be time-consuming.

This standard solution is not therefore fully satisfactory.

SUMMARY OF THE INVENTION

An aim of the present invention is to remedy these drawbacks. It relates to a system for collecting and analyzing data relating to safety and comfort criteria of an aircraft.

According to the invention, the system for collecting and analyzing data comprises:
- an acquisition unit configured to acquire basic aircraft information before a flight of the aircraft and values of flight parameters during the flight of the aircraft, the basic information and the flight parameter values forming a first set of digital data;
- a measurement unit configured to measure values of environmental parameters of the aircraft during the flight of the aircraft and to store a second set of digital data representative of the environmental parameter values;
- an analysis unit configured to analyze the first and second sets of digital data;
- a first radio communication system configured to transmit sets of digital data between the acquisition unit and the measurement unit; and
- a second radio communication system configured to transmit sets of digital data between the measurement unit and the analysis unit.

Thus, by virtue of the invention, a system is available that allows for a rapid collection and analysis of the data. Indeed, the data measured by the measurement unit, namely the second set of digital data, are directly stored in a digital format which simplifies the storage thereof and the transfer thereof to the analysis unit.

Advantageously, the measurement unit comprises at least one of the following sensors:
- a noise sensor, configured to measure noise values and supply noise digital data representative of the noise values;
- a vibration sensor, configured to measure vibration values and supply vibration digital data representative of the vibration values; and
- a sensor of hygrometric parameters, configured to measure values of at least one the following hygrometric parameters:
  - a temperature;
  - a humidity; and
  - a pressure;
  and supply hygrometric digital data representative of the hygrometric parameter values, the measurement unit also comprising a storage unit configured to record at least one of the noise, vibration and hygrometric digital data, the second set of digital data comprising at least one of the digital data.

In a particular embodiment, the measurement unit also comprises an air quality sensor, configured to measure values of air quality parameters and store air quality digital data representative of the values of the air quality parameters, the air quality digital data being included in the second set of digital data.

Furthermore, advantageously, the measurement unit also comprises a clock.

Moreover, advantageously, the measurement unit also comprises an energy accumulator, the energy accumulator being rechargeable by one of the following means:
- induction;
- USB ("Universal Serial Bus") port.

In addition, the measurement unit comprises a first control module configured to transmit a command to store the first and second sets of digital data in a storage module and a command to transmit the first and second sets of digital data by the second radio communication system, from the measurement unit to the analysis unit.

Preferably, the system also comprises a display unit configured to display at least some of the noise digital data received from the measurement unit via a third radio communication system.

Advantageously, the display unit also comprises a second control module configured to transmit, via the third radio communication system, a command to store the second set of digital data in a storage module of the measurement unit and a command to transmit the first and second sets of digital data by the second radio communication system, from the measurement unit to the analysis unit.

Moreover, the analysis unit comprises a data base comprising a plurality of environment models provided with predetermined threshold values and a comparison module capable of comparing the noise and vibration digital data with at least some of the environment models and of transmitting a signal as a function of the result of the comparison.

Furthermore, in a first variant, the analysis unit is incorporated in the measurement unit and, in a second variant, the analysis unit and the measurement unit are two distinct units.

Preferably, the first radio communication system comprises at least a first transmission element arranged in the acquisition unit and a second transmission element arranged in the measurement unit.

Moreover, advantageously, the second radio communication system comprises at least a third transmission element arranged in the acquisition unit and a fourth transmission element arranged in the measurement unit.

Furthermore, advantageously, the third radio communication system comprises a fifth transmission element arranged in the display unit and a sixth transmission element arranged in the measurement unit.

BRIEF DESCRIPTION OF THE DRAWINGS

The attached figures will give a good understanding of how the invention can be produced. In these figures, identical references denote similar elements. More particularly.

DETAILED DESCRIPTION OF THE PREFERRED EMBODIMENTS

Figure 1:
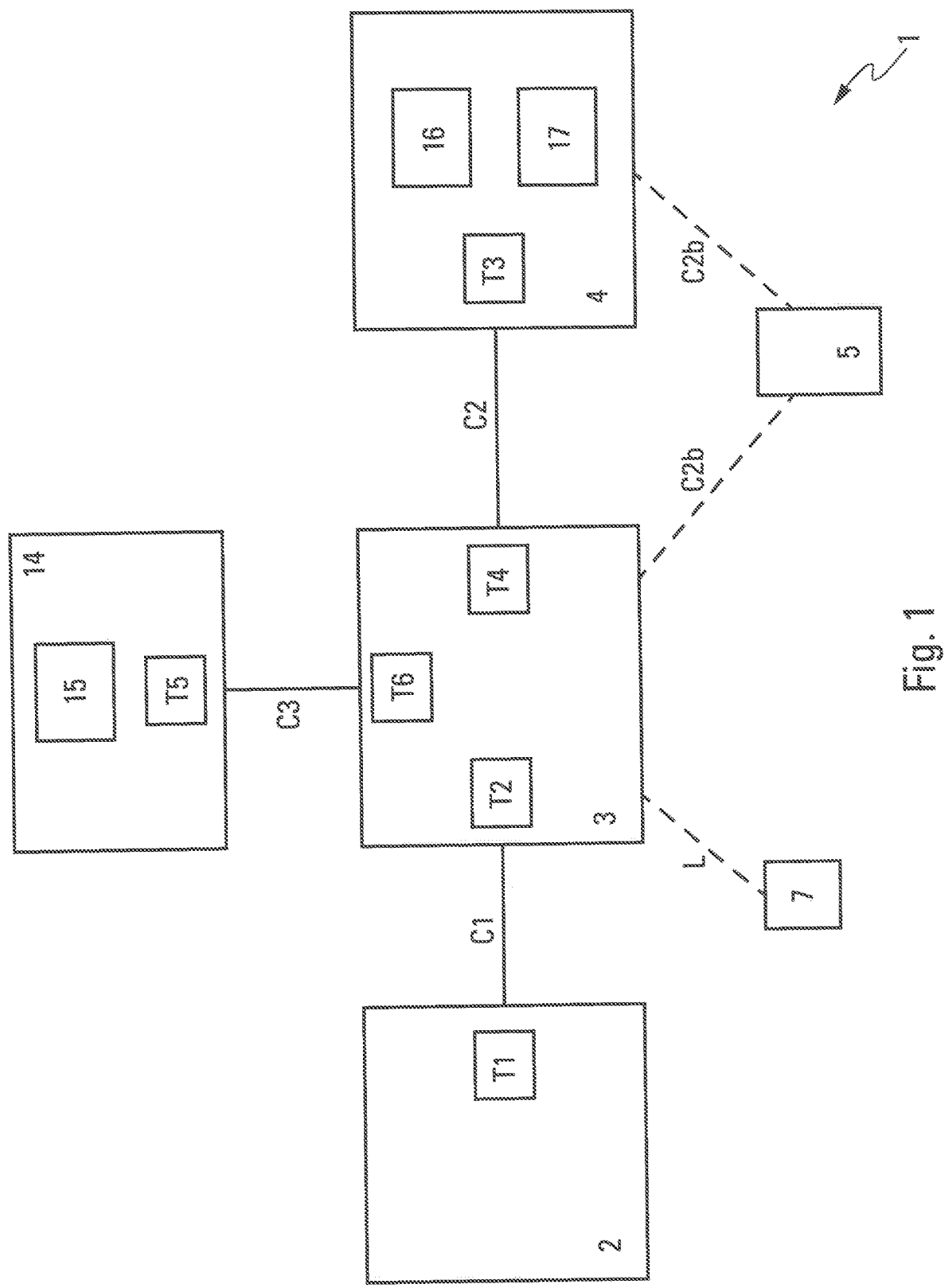
FIG. 1 is the block diagram of a particular embodiment of a system for collecting and analyzing data conforming to the invention.

The system for collecting and analyzing data 1 (hereinafter "system 1"), schematically represented in a particular embodiment in FIG. 1, is intended to collect then to analyze data relating to safety and comfort criteria of an aircraft, in particular a transport airplane. These data are generally collected during at least one test flight of the aircraft. A test flight is understood to be a flight of the aircraft during which different parameters relating to the comfort and to the safety of the aircraft are measured.

In the embodiment illustrated in FIG. 1, the system 1 comprises:
- an acquisition unit 2 which is configured to collect basic information and values of flight parameters of the aircraft. These basic information and these flight parameter values form a first set of digital data;
- a measurement unit 3 which is configured to measure values of environmental parameters inside the aircraft during the test flight. The measurement unit 3 stores, preferably in a memory (not represented) incorporated in the measurement unit 3, these measured values in the form of a second set of digital data;
- an analysis unit 4 which is configured to analyze digital data, in particular the first and second sets of digital data received from the acquisition unit 2 and from the measurement unit 3. The analysis unit 4 compares these first and second sets of digital data to predetermined threshold values which are characteristic of safety and comfort criteria.

The system 1 comprises, in addition, a system C1 for communication by radio channel. This communication system C1, which is a wireless network, is configured to transmit data, and, in particular, the first set of digital data, between the acquisition unit 2 and the measurement unit 3. The communication system C1 comprises at least one transmission element T1 arranged in the acquisition unit 2 and one transmission element T2 arranged in the measurement unit 3.

In a preferred embodiment represented in FIG. 1, the communication system C1 is a short-range radio frequency system of WIFI ("Wireless Fidelity") type, which transfers the first set of digital data from the transmission element T1 in the acquisition unit 2 to the transmission element T2 in the measurement unit 3.

Furthermore, the system 1 comprises, in addition, a system C2 for communication by radio channel, configured to transmit data, and, in particular, the first and second sets of digital data, between the measurement unit 3 and the analysis unit 4.

The communication system C2 comprises at least a transmission element T3 arranged in the analysis unit 4 and a transmission element T4 arranged in the measurement unit 3. In a first embodiment, the transmission element T2 and the transmission element T4 are one and the same transmission element. In a variant, the transmission element T2 and the transmission element T4 are different transmission elements.

In a preferred embodiment, the communication system C2 is a mobile telephony network, preferably of 4G type. More particularly, the communication system C2 transfers the first and second sets of digital data from the transmission element T2 to the transmission element T3. It also transmits digital data relating to the updating of the measurement unit 3 from the transmission element T3 to the transmission element T4.

In addition to or in a variant of the preferred embodiment mentioned above, and as represented in FIG. 1 by dotted lines, the transmission of the first and second sets of digital data is performed by an auxiliary communication system C2b. This communication system C2b is a short-range radio frequency system of WIFI type, which comprises a relay antenna 5 through which the first and second sets of digital data transit between the transmission element T4 and the transmission element T3. As an example, the relay antenna 5 is arranged on a building of an airport in which the aircraft is located.

Moreover, in a preferred embodiment, the acquisition unit 2 is a portable computer arranged in the cockpit of the aircraft and connected to an avionics bus. Before the test flight of the aircraft, the acquisition unit 2 collects basic aircraft information. This basic information can be the serial number, the type of the aircraft, etc. It is stored in the acquisition unit 2 manually by an operator. In a variant, it is stored in the acquisition unit 2 automatically. Values of flight parameters such as the pressure, the speed or the altitude of the aircraft are also collected and stored by the acquisition unit 2 during the test flight of the aircraft, automatically. The first set of digital data comprises, in particular, the basic information and the flight parameter values.

Figure 2:
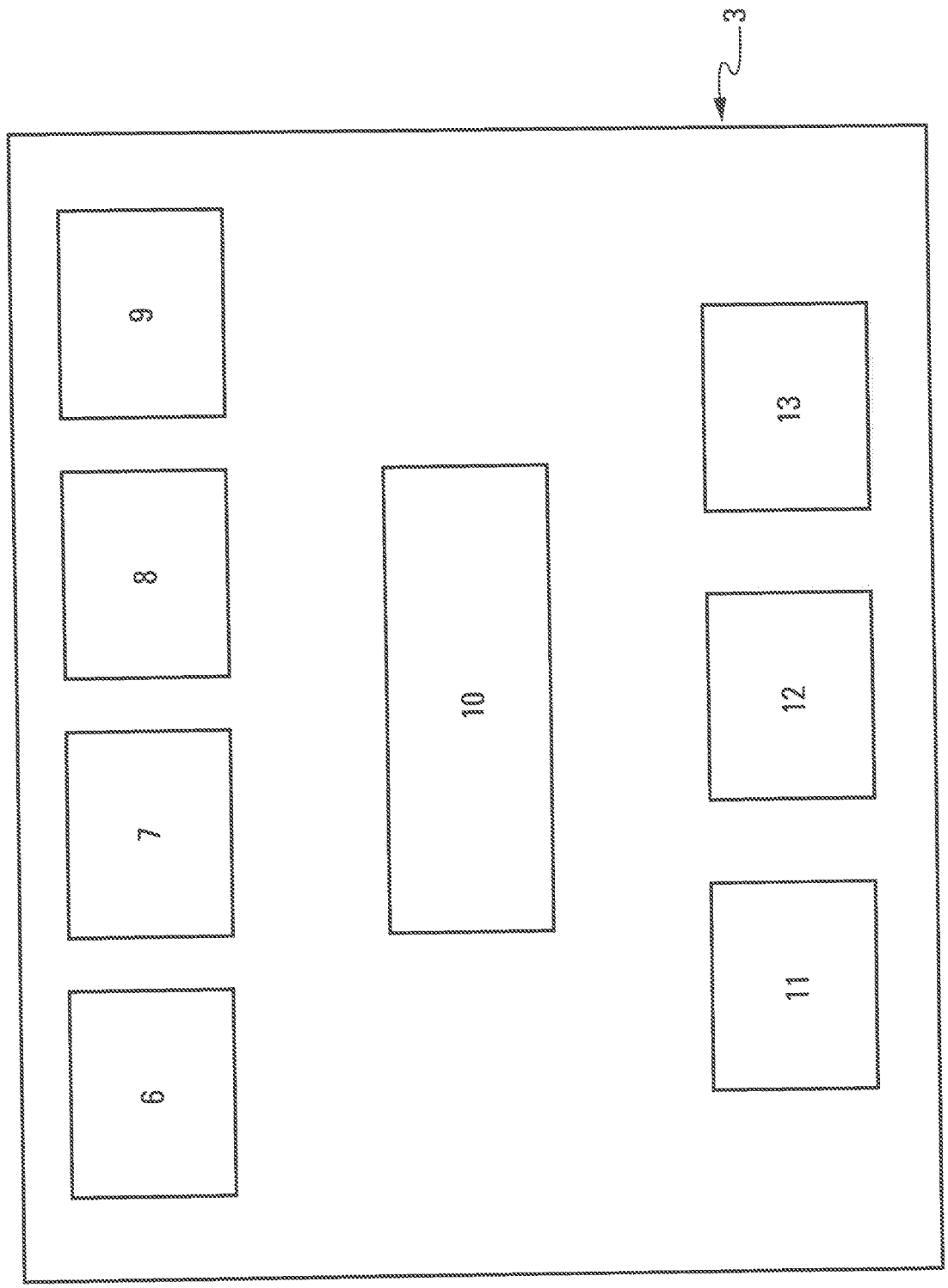
FIG. 2 schematically illustrates a measurement unit of the system for collecting and analyzing data in a preferred embodiment.

As represented in FIG. 2, the measurement unit 3 comprises a plurality of sensors including:
- a noise sensor 6 which measures noise values inside the aircraft, during the test flight of the aircraft. As an example, the noise sensor 6 is a microphone. This microphone comprises a class 1 acoustic capsule. Values measured by the noise sensor 6 are directly transformed into noise digital data;
- a vibration sensor 7 which measures vibration values inside the aircraft. In a preferred embodiment, the vibration sensor 7 is an electromechanical microsystem incorporated in the measurement unit 3 and comprising a tri-axial accelerometer. This vibration sensor 7 can operate autonomously. It is not therefore necessary for an operator to remain alongside the vibration sensor 7 during the measurements. The values measured by the vibration sensor 7 are converted directly into vibration digital data. Instead of being incorporated in the measurement unit 3, the vibration sensor 7 is, in a variant, installed in the aircraft and linked to the measurement unit 3 by a link L, as represented by dotted lines in FIG. 1. The link L is of wired type; and
- a sensor of hygrometric parameters 8. This sensor of hygrometric parameters 8 is a microelectromechanical system. It can measure the temperature, the humidity and/or the pressure in the aircraft during the test flight. Furthermore, the measured values of the hygrometric parameters are directly stored in the form of hygrometric digital data.

In a particular embodiment, the measurement unit 3 also comprises an air quality sensor 9. This air quality sensor 9 is, preferably, arranged in the microelectromechanical system comprising the sensor of hygrometric parameters 8 and the vibration sensor 7. The air quality sensor 9 measures values of parameters characteristic of the quality of the air inside the aircraft. The air quality sensor 9 provides digital data representative of the measured values of the air quality parameters.

Moreover, the measurement unit 3 comprises a storage module 10 which stores the digital data provided by the noise sensor 6, the vibration sensor 7, the sensor of hygrometric parameters 8 and the air quality sensor 9. The second set of digital data includes these stored digital data.

Furthermore, the storage module 10 also stores the first set of digital data, transmitted by the communication system C1 and received by the transmission element T2 of the measurement unit 3.

In one embodiment, the measurement unit 3 also comprises a clock 11. The clock 11 can be updated by the reception of data transmitted by a satellite positioning system of GPS ("Global Positioning System") type. In a variant, the clock 11 of the measurement unit 3 is synchronized to an atomic clock by the reception of data by the transmission element T4 of the measurement unit 3.

Furthermore, as represented in FIG. 2, the measurement unit 3 also comprises an energy accumulator 12 which is rechargeable. The energy accumulator 12 renders the use of the measurement unit 3 autonomous. In a first variant, the energy accumulator 12 is rechargeable on an energy transmission plate by induction. In a second variant, the energy accumulator 12 is rechargeable by the connection of the measurement unit 3 to a USB port.

The measurement unit 3 also comprises a control module 13 configured to command the storage and the transmission of digital data. A storage command transmitted by the control module 13 commands the storage of the first and second sets of digital data in the storage module 10. In a preferred embodiment, the storage of the second set of data is performed in real time, after each measurement of values performed by the noise sensor 6, the vibration sensor 7, the sensor of hygrometric parameters 8 and the air quality sensor 9. In a variant, the storage of the second set of digital data is performed at the end of the test flight of the aircraft, when all the measurements have been performed by the sensors. The control module 13 allows an operator to also transmit a command ordering the transmission of the first and second sets of digital data from the measurement unit 3 to the analysis unit 4.

In a preferred embodiment, the system 1 also comprises a display unit 14, as represented in FIG. 1. The display unit 14 is a screen configured to display at least some of the noise digital data representative of the measured noise values. Preferably, this display unit 14 is a tablet. The digital data displayed on the screen are transmitted from the measurement unit 3 to the display unit 14 by a wireless communication system C3. This communication system C3 comprises a transmission element T5 arranged in the display unit 14 and a transmission element T6 arranged in the measurement unit 3. In a particular embodiment, the transmission element T6 is a different element from the transmission element T2 or from the transmission element T4. In a variant, the transmission element T6 and the transmission element T2 or the transmission element T4 of the measurement unit 3 are one and the same transmission element.

In a preferred embodiment, the communication system C3 is a short range radio wave transmission system of Bluetooth type. The transmission of the noise digital data by the communication system C3 is performed during the test flight of the aircraft. The display of some of the noise digital data, which represent a real-time acoustic spectrum, allows an operator to identify the presence or the absence of incorrect data and therefore detect a possible problem.

Furthermore, in addition, the display unit 14 comprises a control module 15. This control module 15 allows an operator to transmit commands, via the communication system C3, to the measurement unit 3. The storage command orders the storage, in the storage module 10, of the digital data from the sensors of the measurement unit 3. The control module 15 makes it possible to also transmit a data transmission command. This transmission command orders the measurement unit 3 to transmit the first and second sets of digital data (stored in the storage module 10) to the analysis unit 4, via the communication system C2, C2b.

As represented in FIG. 1, the analysis unit 4 is provided with a data base 16. This data base 16 contains one or more environment models provided with predetermined threshold values. These environment models represent models representative of acoustic spectra whose behavioral significance is already determined.

The analysis unit 4 also comprises a comparison module 17. This comparison module 17 compares the noise and vibration digital data received via the communication system C2 with at least one of the environment models contained in the data base 16. Based on the result of the comparison, the comparison module 17 transmits a signal.

Moreover, in a particular embodiment, the analysis unit 4 and the measurement unit 3 are two distinct units. However, in a variant, the analysis unit 4 is incorporated in the measurement unit 3. The communication between the analysis unit 4 and the measurement unit 3 can therefore be wired.

The system 1 is primarily used in the context of processes for checking safety and comfort criteria of an aircraft, for example, before its delivery to a client. An example of operation of the system 1 is as follows.

Before the take-off of the aircraft, the acquisition unit 2 is connected, in the cockpit of the aircraft, to the avionics bus in order to receive basic information. This basic information concerns, in particular, the type of the aircraft, its serial number, etc., and is stored in the acquisition unit 2. In parallel, the clock 11 of the measurement unit 3 is updated. The updating is performed, preferably, by the reception, by the transmission element T4 arranged in the measurement unit 3, of data transmitted by a mobile network of 4G type. In the absence of a mobile network of 4G type, the updating is performed by the transmission of data from a satellite positioning system. This updating of the clock 11 with an atomic clock makes it possible to date each digital datum deriving from a value measured by the noise sensor 6, the vibration sensor 7, the sensor of hygrometric parameters 8 and the air quality sensor 9 with great accuracy.

When the aircraft begins its test flight, the sensors 6, 7, 8 and 9 of the measurement unit 3 begin the measurements. In particular, the noise sensor 6 collects noise values via the microphone which are converted into noise digital data. The tri-axial accelerometer of the vibration sensor 7 measures the vibrations in the aircraft which are also converted into vibration digital data. The microelectromechanical system also comprising the sensor of hygrometric parameters 8 and the air quality sensor 9 measures, respectively, hygrometric parameter values such as temperature, pressure and humidity values and air quality values in the aircraft. All these measured values are directly converted into digital data which results in a time-saving before their transmission.

During the measurements, some of the noise digital data, which constitute the acoustic spectrum, can be transmitted from the transmission element T6 to the transmission element T5 via the communication system C3. The display unit 14 then allows an operator to view the acoustic spectrum and identify any problem.

Moreover, the noise digital data, the vibration digital data, the hygrometric parameter digital data and the air quality digital data are stored in the storage module 10 of the measurement unit 3. The storage is controlled by the control module 15 of the display unit 14 which transmits a storage command via the communication system C3. The storage command can also be ordered by an operator who presses on a button arranged on the measurement unit 3, which activates the control module 13.

During the test flight of the aircraft, the acquisition unit 2 also collects flight parameter values, in real time and automatically. These flight parameters correspond in particular to the altitude, to the speed and to the pressure of the aircraft. These flight parameter values are stored, in real time, in a memory of the acquisition unit 2 with the basic information collected before the test flight.

At the end of the test flight, the aircraft lands on an airport. The transmission element T1 transfers to the transmission element T2 the digital data of the basic information and of the flight parameter values which form the first set of digital data, via the communication system C1, which can be a WIFI network. This first set of digital data is then stored in the storage module 10 with the second set of digital data.

The first and second sets of digital data are then transmitted to the analysis unit 4. The transmission command is ordered, either directly by the control module 13, from the measurement unit 3 to the communication system C2, C2b, or by the control module 15 of the display unit 14. In the latter case, the control command is first of all transmitted from the transmission element T5 to the transmission element T6 via the communication system C3 then via the communication system C2, C2b.

Preferably, the communication system C2, which is, for example, a mobile network, transmits these sets of digital data to the analysis unit 4. The transmission of the first and second sets of digital data can also be performed by the communication system C2b which is a network of WIFI type, that is to say, short range. The communication system C2b then transmits the sets of digital data from the transmission element T4 of the measurement unit 3 to a relay antenna 5. This relay antenna 5, which must be close to the position of the aircraft, is, for example, an antenna placed on the roof of a building of the airport. Then, the sets of digital data are transmitted from the relay antenna 5 to the transmission element T3 of the analysis unit 4.

The analysis unit 4 is provided with a data base 16 comprising environment models. These models represent behaviors of the noise and of the vibrations which have already been analyzed and which are already identified. Thus, when the sets of digital data are received by the analysis unit 4, they are compared by the comparison module 17 to the models of the data base 16. After analysis, the comparison module 17 transmits a signal representative of the comparison between these sets of data and in particular the threshold values of the environment models.

Thus, the system 1 makes it possible to collect parameter values of parameters, in particular acoustic and concerning vibrations with a metrological accuracy (less than 1 mg) and to convert them directly into digital data, which facilitates their subsequent transmission for analysis. Moreover, the display screen 14 allows an operator to be able to identify in real time, during the measurements, whether a problem has occurred.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for collecting and analyzing data relating to safety and comfort criteria of an aircraft, the system comprising:
   a computer used as an acquisition unit configured to acquire basic aircraft information before a flight of said aircraft and values of flight parameters during the flight of said aircraft, said basic aircraft information and said flight parameter values forming a first set of digital data;
   a measurement unit comprising a plurality of sensors configured to measure values of environmental conditions of the inside the aircraft during the flight of said aircraft and to record a second set of digital data representative of said environmental condition values in a memory;
   an analysis unit configured to perform a comparison between said first and second sets of digital data and a predetermined threshold values which are characteristic of safety and comfort criteria, wherein the comparison determines whether the aircraft meets the predetermined threshold values prior to delivery of the aircraft;

a first radio communication system configured to transmit sets of digital data between the acquisition unit and the measurement unit; and a second radio communication system configured to transmit sets of digital data between the measurement unit and the analysis unit.

2. The system according to claim 1, wherein the plurality of sensors of the measurement unit comprises at least one sensor, as follows:

a noise sensor, configured to measure noise values inside the aircraft during flight and supply noise digital data representative of said noise values;

a vibration sensor, configured to measure vibration values inside the aircraft and supply vibration digital data representative of said vibration values; and a sensor of hygrometric conditions, configured to measure values of at least one hygrometric condition inside the aircraft during flight, as follows:
a temperature;
a humidity; and
a pressure;

and supply hygrometric digital data representative of said hygrometric condition values, a storage module configured to record at least one of said noise, vibration and hygrometric digital data, the second set of digital data comprising at least one of said digital data.

3. The system according to claim 1, wherein the measurement unit also comprises an air quality sensor, configured to measure values of air quality conditions and store air quality digital data representative of the values of the air quality conditions, said air quality digital data being included in the second set of digital data.

4. The system according to claim 1, wherein the measurement unit also comprises a clock.

5. The system according to claim 1, wherein the measurement unit also comprises an energy accumulator, said energy accumulator being rechargeable by one of:
induction;
a USB port.

6. The system according to claim 1, wherein the measurement unit comprises a first control module configured to transmit a command to store said first and second sets of digital data in a storage module and a command to transmit said first and second sets of digital data by the second radio communication system, from the measurement unit to the analysis unit.

7. The system according to claim 2, further comprising a display unit configured to display at least some of the noise digital data received from the measurement unit via a third radio communication system.

8. The system according to claim 7, wherein the display unit also comprises a second control module configured to transmit, via the third radio communication system, a command to store said second set of digital data in a storage module of the measurement unit and a command to transmit said first and second sets of digital data by the second radio communication system, from the measurement unit to the analysis unit.

9. The system according to claim 1, wherein the analysis unit comprises a data base comprising a plurality of environment models provided with predetermined threshold values and a comparison module capable of comparing noise data related to measured noise inside the aircraft during flight and vibration digital data related to measured vibration values inside the aircraft with at least some of said environment modules and of transmitting a signal as a function of a result of the comparison.

10. The system according to claim 1, wherein the analysis unit is incorporated in the measurement unit.

11. The system according to claim 1, wherein the analysis unit and the measurement unit are two distinct units.

12. The system according to claim 1, wherein the first radio communication system comprises at least a first transmission element arranged in the acquisition unit and a second transmission element arranged in the measurement unit.

13. The system according to claim 1, wherein the second radio communication system comprises at least a third transmission element arranged in the acquisition unit and a fourth transmission element arranged in the measurement unit.

14. The system according to claim 7, wherein the third radio communication system comprises a fifth transmission element arranged in the display unit and a sixth transmission element arranged in the measurement unit.

* * * * *